United States Patent [19]

Levasseur

[11] Patent Number: 4,968,463
[45] Date of Patent: Nov. 6, 1990

[54] PROCESS FOR MAKING MOLDED OR EXTRUDED OBJECTS FROM WASTE CONTAINING PLASTIC MATERIALS

[75] Inventor: Jean-Pierre Levasseur, Germain En Laye, France

[73] Assignee: OTVD (Omnium de Traitements et de Valorisation des dechets), Paris, France

[21] Appl. No.: 333,360

[22] Filed: Apr. 5, 1989

[51] Int. Cl.$^5$ .......................... B29B 17/00; B29B 9/12
[52] U.S. Cl. ...................................... 264/40.1; 264/37; 264/122; 264/140; 264/328.18; 264/209.3; 264/349; 264/DIG. 69; 425/379.1
[58] Field of Search ................ 264/40.1, 37, DIG. 69, 264/209.3, 177.1, 122, 349, 140, 328.18; 425/378.1, 379.1, 71

[56] References Cited

U.S. PATENT DOCUMENTS

| | | |
|---|---|---|
| 3,344,212 | 9/1967 | Francis .................................. 264/37 |
| 3,567,815 | 3/1971 | Frank .................................... 264/37 |
| 3,806,562 | 4/1974 | Lamort et al. ....................... 264/140 |
| 4,067,826 | 1/1978 | Emery ................................... 264/37 |
| 4,138,534 | 2/1979 | Tedesco ............................. 264/45.3 |
| 4,795,603 | 1/1989 | Nagayasu .............................. 264/37 |

FOREIGN PATENT DOCUMENTS

| | | | |
|---|---|---|---|
| 52-23179 | 2/1977 | Japan ................................... 264/37 |
| 56-15319 | 2/1981 | Japan ................................... 264/37 |
| 56-46736 | 4/1981 | Japan ................................... 264/37 |

*Primary Examiner*—Jeffery Thurlow
*Attorney, Agent, or Firm*—Browdy and Neimark

[57] ABSTRACT

A process is provided for producing extruded or molded objects from waste containing plastic materials. The process includes the following steps: preliminary physical treatment, optional drying, preheating to a temperature of from 80° to 160° C., mixing at a temperature of from 120°–250° C., and injection molding or extrustion.

12 Claims, 1 Drawing Sheet

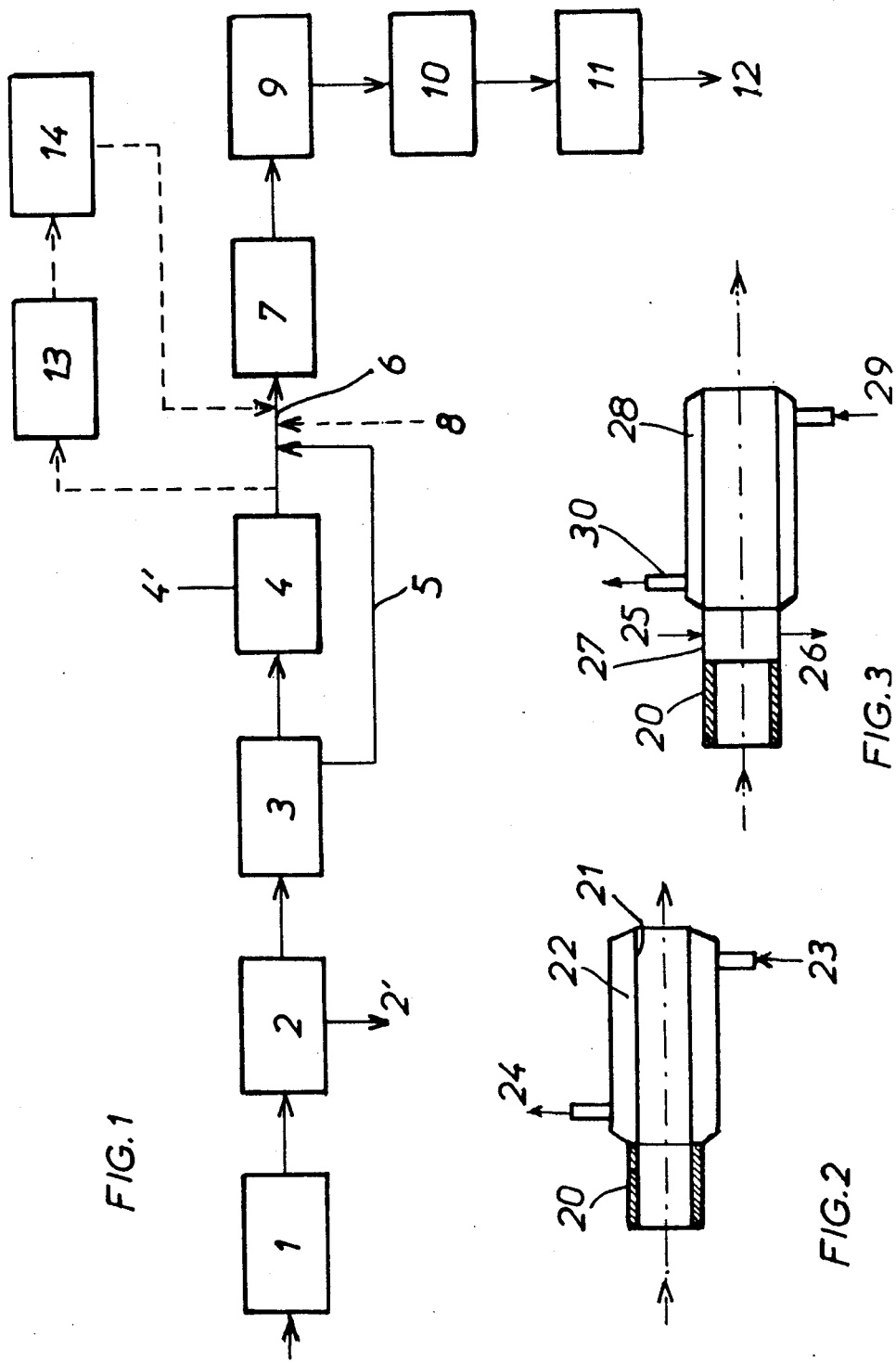

PROCESS FOR MAKING MOLDED OR EXTRUDED OBJECTS FROM WASTE CONTAINING PLASTIC MATERIALS

FIELD OF THE INVENTION

This invention pertains to a process for making extruded or molded objects from waste a mixture of thermoplastic materials, i.e. non-virgin plastic, the disposal of which, as we are aware, is an increasingly crucial problem for industrialized countries.

BACKGROUND OF THE INVENTION

Certain techniques such as incineration do make it possible to dispose of these waste materials, but they generate considerable pollution, especially by releasing hydrochloric acid into the atmosphere.

SUMMARY OF THE INVENTION

One object of the invention is to propose a process and device to utilize waste containing plastic materials without generating additional pollution.

Another object is to recycle such waste materials by making products that can be re-used in industry, and that are made of a material that is inert with respect to corrosion, is mechanically resistant and can be machined easily.

According to the invention, these objects and others that will be disclosed below are achieved through a process of the above-specified type comprising the following sequence of steps: a preliminary physical treatment, drying if the water content of the initial materials is over approximately 8% by weight, preheating to a temperature of 80 to 160 C., mixing or kneading at a temperature of 120 to 250° C., and injection molding or extrusion.

The extruded or molded products thus obtained meet the aforementioned requirements; they are also inexpensive, because they are made from recycled waste materials.

Moreover, various operating tests have shown that preliminary sorting of thermoplastic materials was not necessary in the process according to the invention, which is not true for various known processes, which present problems when the polyvinyl chloride (PVC) content is too high.

In the present process, on the contrary, the only important factor is the thermoplastic material content, which is preferably over 65% by weight of the mixture used for extrusion or molding. The presence, for example, of materials that can be thermohardened, is not a problem, provided that the content of thermoplastic materials indicated above be at the required level.

Advantageously, and before the preheating stage, the process according to this invention comprises the addition of coloring and/or filler agents; the latter can be composed of waste materials such as compost refuse, incineration plant cinders, old paper, ground rags, or fines extracted from household waste, which clearly increase the rigidity of products made according to the invention.

The preliminary physical treatment stage specified above preferably comprises shredding to a granulometry of approximately 100 mm, metal removal and/or grinding to a granulometry under approximately 40 mm.

In some cases, such as when the extrusion unit is centralized and far from the area where the processing according to the invention begins, the product according to the invention can be subject to granulation and be stored temporarily before the above-specified preheating stage.

This invention also concerns a device for the implementation of the above-specified process, which includes a sequence of physical pretreatment unit(s), a preheating screw conveyor having a double cover, a heating kneader unit having a double casing, and a screw-type extrusion machine or injection molding unit.

The physical pretreatment equipment of the device according to the invention preferably comprises a shredder, a magnetic sorting unit and/or a disk mill.

When extruded sections having an excellent surface quality are to be produced, it is advantageous for the extrusion die to be followed by a cooled pipe having a double casing, of the same diameter.

If, on the contrary, a lower surface quality level is acceptable, the extrusion die can be followed by a larger diameter pipe endowed with means to inject a coolant fluid between its inside wall and the extruded section, and which in turn is followed by a cooled pipe having a double casing.

BRIEF DESCRIPTION OF THE DRAWINGS

The description below, which is provided on a purely non-restrictive basis, will provide a clear understanding of how this invention may be implemented. It must be read in reference to the attached drawings, wherein:

FIG. 1 shows the main steps of the process according to the invention, in diagrammatic form;

FIG. 2 is a schematic cross section of a cooling, device that can be used in this process, and FIG. 3 is also a schematic cross section of a variation of the cooling device in FIG. 2.

DETAILED DESCRIPTION OF THE INVENTION

As shown by the schematic diagram in FIG. 1, the initial product intended to be treated using the process according to this invention, which is essentially composed of thermoplastic waste, first of all undergoes shredding 1 intended to produce a granulometry level of approximately 100 mm. If necessary, and, depending on the source of the waste, ferrous metals are removed from the resulting shredded product in 2, and taken away in 2', which makes it possible to protect the equipment located downstream.

The product is subsequently ground more finely in 3, using a disk mill, for example, so that its final granulometry is under approximately 40 mm.

Moreover, in order to obtain a final product having the proper mechanical characteristics, the water content of the waste for the rest of the operations must be under 3% by weight. Drying 4 is necessary if the initial products contain over 8 or 10% water, this value being due to the reasons set forth below. If the moisture content is under said value, drying unit 4 may be bypassed, as shown by circuit 5 in FIG. 1, which, of course, is also adapted to perfectly dry waste products.

When it reaches point 6 in FIG. 1, at the outlet of drying unit 4 or circuit 5, the treatment continues with preheating 7, after the addition 8, if applicable, of filler materials and/or coloring agents.

On this subject, we will note that tests have shown that sections made using plastic waste materials alone are relatively flexible. To make these sections more rigid, we can add filler materials in 8 like those already used in the plastics industry, such as calcium carbonate.

However, the addition of other waste materials for which disposal is a problem presents an advantageous solution. Thus, the addition of compacting refuse, incineration plant cinders, old or ground rags, or fines extracted from household waste materials, clearly improves the mechanical properties of the final product.

In this way, the addition of fines and ground rags, depending on the nature and content of said additives, brings the bending rupture stress from 20-30 N/mm$^2$ to 35-50 N/mm$^2$.

Preheating 7 is intended to bring the product to a temperature of approximately 80 to 160° C., which is the softening temperature of the principal thermoplastic materials, as well as to ensure drying, if necessary, as indicated above.

The preheating 7 is done in a screw conveyor having a double casing, with the necessary heat being provided by a heat-carrying fluid or steam, which circulates in the double casing or in the center shaft and the screw blades.

The paste produced in the earlier steps is next prepared by kneading 9. Said device is endowed with a double casing wherein a heat-carrying fluid or steam circulates, maintaining a sufficiently high temperature of approximately 120 to 250° C. At these temperatures, which industry specialists can easily select after simple preliminary tests, and which depend on the nature of the waste materials to be processed and the subsequent treatments, the mixture melts, and kneading 9 ensures a thorough blend, producing a paste ready to undergo the extrusion or molding process 10.

If phase 10 consists of extrusion, the latter is done using a screw-type extruding machine, which also comprises a double heating casing, or which is endowed with electrical resistors that make it possible to hold the paste at the above-indicated temperature.

The paste is extruded by the screw through a die heated using strip heaters, for example, and whose cross section is identical to that of the section chosen for the finished product.

According to an advantageous embodiment shown schematically in FIG. 2, said die 20 is followed by a smooth pipe 21, whose inside diameter is equal to that of die 20. Said pipe 21 is made preferably of aluminum or copper, in order to ensure the most effective thermal exchange; it is cooled by a casing 22 wherein a low-temperature fluid is introduced in 23, issuing therefrom in 24. Said cooling must nonetheless take into account the fact that a considerable degree of self-heating occurs due to the back pressure exerted by the caliber 21, with the extruding machine being heated to a temperature ranging from 100 to 200° C.

In any event, using this device, we obtain a perfectly calibrated product having an impeccable surface quality. However, if we are not seeking a high-quality surface, or if the product has a particularly high mass, which would require very long calibers 21 in order to achieve satisfactory heat exchange, water can be injected immediately following the outlet of the heated die, with said direct exchange making it possible to "capture" the extruded section.

In this embodiment, shown in FIG. 3, die 20 is followed by a pipe 27 having a larger inside diameter, in order to provide a good degree of circulation around the extruded profile for the cold water introduced in 25 into pipe 27, from which it issues in 26. Said water injection is followed by cooling in a pipe 28 having the same inside diameter, which is similar to pipe 21 in FIG. 2, and which, like the latter, is cooled by the circulation of water introduced in 29 into a double casing, which issues therefrom in 30.

In this case, because cooling occurs in a unit 27, 28 having a larger inside diameter than the die, the extruded section cannot be calibrated effectively, and it is thus used only to make products of a lower quality level.

According to another embodiment (not shown), the cooled caliber 21 in FIG. 2 and the water injection pipe 27 having a greater diameter in FIG. 3 can be used end-to-end, followed, if applicable, by another cooled caliber similar to the one 28 in FIG. 3.

In any case, processing ends with cooling 11 (FIG. 1), which preferably takes place, for example, in a water tank, and, in 12, an extruded or molded finished product is produced.

Various tooling tests have shown that said products can be worked with conventional machine tools identical to those used for wood, whether this involves sawing, turning or milling, subject to a few minor modifications, especially pertaining to the cutting angles.

Such products can have numerous applications in industry, especially in viticulture for vine posts, in agriculture for fences, in construction for certain specific applications such as floors for living quarters or self-locking floor tiles, or for ski trail markers in the mountains.

Finally, we will note that if, for example, the physical preparation unit is oversized or if the extrusion unit is centralized and located at another site, it can be advantageous to granulate in 13 the products taken from processing point 6 and to store them in 14, according to the circuit indicated in broken lines in FIG. 1, so that said products can be transported more easily and inexpensively. The foregoing description of the specific embodiments will so fully reveal the general nature of the invention that others can, by applying current knowledge, readily modify and/or adapt for various applications such specific embodiments without departing from the generic concept, and therefore such adaptations and modifications are intended to be comprehended within the meaning and range of equivalents of the disclosed embodiments. It is to be understood that the phraseology or terminology herein is for the purpose of description and not of limitation.

I claim:

1. A process for making extruded or molded objects from waste containing primarily a mixture of thermoplastic materials, comprising:
   preliminary physical processing of said waste;
   determining the water content of said waste and if the water content is above about 8% by weight, drying said waste materials to a water content of not more than about 8% by weight;
   preheating said waste to a temperature of from 80 to 160° C.;
   kneading said waste at a temperature of from 120 to 250° C.; and
   molding said waste by injection molding or extrusion to form a final product.

2. The process according to claim 1 wherein said final product contains at least 65% by weight of thermoplastic materials.

3. The process according to claim 1 wherein, after said waste are dried, filler materials are added.

4. The process according to claim 1 wherein, after said waste are dried, coloring materials are added.

5. The process according to claim 3 wherein, after said waste are dried, coloring materials are added.

6. The process according to claim 3 wherein said filler materials are composed of waste products.

7. The process according to claim 1 wherein said preliminary physical treatment comprises shredding said waste to a granulometry of approximately 100 mm.

8. The process according to claim 1 wherein said preliminary physical treatment comprises removing metals from said waste.

9. The process according to claim 1 wherein said preliminary physical treatment comprises grinding to a granulometry under approximately 40 mm.

10. The process according to claim 7 wherein said preliminary physical treatment further includes removing metals from said waste.

11. The process according to claim 8 wherein said preliminary physical treatment further includes grinding said waste to a granulometry under approximately 40 mm.

12. The process according to claim 1 wherein, before said preheating stage, the waste is granulated and stored temporarily before continuing processing.

* * * * *